(12) United States Patent
Braschi et al.

(10) Patent No.: US 11,142,868 B2
(45) Date of Patent: Oct. 12, 2021

(54) USE OF MESOPOROUS SILICA

(71) Applicants: UNIVERSITA' DEGLI STUDI DEL PIEMONTE ORIENTALE "A. AVOGADRO", Vercelli (IT); ALMA MATER STUDIORUM—UNIVERSITA' DI BOLOGNA, Bologna (IT)

(72) Inventors: Ilaria Braschi, Bologna (IT); Chiara Bisio, Vercelli (IT); Enrico Buscaroli, Bologna (IT); Daniele Bussini, Bologna (IT); Graziano Elegir, Bologna (IT); Leonardo Marchese, Vercelli (IT)

(73) Assignees: UNIVERSITA DEGLI STUDI DEL PIEMONTE ORIENTALE "A. AVOGADRO"; ALMA MATER STUDIORUM—UNIVERSITA' DI BOLOGNA

( * ) Notice: Subject to any disclaimer, the term of this patent is extended or adjusted under 35 U.S.C. 154(b) by 309 days.

(21) Appl. No.: 16/316,867

(22) PCT Filed: Jul. 12, 2017

(86) PCT No.: PCT/IB2017/054214
§ 371 (c)(1),
(2) Date: Jan. 10, 2019

(87) PCT Pub. No.: WO2018/011735
PCT Pub. Date: Jan. 18, 2018

(65) Prior Publication Data
US 2019/0301096 A1    Oct. 3, 2019

(30) Foreign Application Priority Data
Jul. 12, 2016   (IT) .................. 102016000072535

(51) Int. Cl.
*D21C 9/08* (2006.01)
*D21H 27/10* (2006.01)
(Continued)

(52) U.S. Cl.
CPC ............... *D21C 9/08* (2013.01); *B01J 20/22* (2013.01); *B01J 20/28004* (2013.01);
(Continued)

(58) Field of Classification Search
CPC .......... D21H 17/13; D21H 21/20; D21C 9/08; D21C 5/02
See application file for complete search history.

(56) References Cited

U.S. PATENT DOCUMENTS

2012/0103543 A1* 5/2012 D'Allest ................ D21C 5/027
162/5

FOREIGN PATENT DOCUMENTS

| CN | 105568752 A |   | 5/2016 |
| JP | 2000265390 A | * | 9/2000 |
| WO | 2015092714 A1 |   | 6/2015 |

OTHER PUBLICATIONS

Buscaroli et al., Stabilization of mineral oil hydrocarbons in recycled paper pulp by organo-functionalized mesoporous silicas and evaluation of migration to food, Mar. 17, 2017, Eur Food Res Tecol, 243:1471-1484 (Year: 2017).*
(Continued)

*Primary Examiner* — Anthony Calandra
(74) *Attorney, Agent, or Firm* — McAndrews Held & Malloy, Ltd.

(57) ABSTRACT

A use of organofunctionalized mesoporous silica for the production of recycled paper; the organofunctionalized mesoporous silica comprises a base mesoporous silica having, on its surface, groups having the following general formula
(Continued)

(I), wherein $Si^1$ is a silicon atom of the base mesoporous silica, $R^1$ is a $C_1$-$C_5$ aliphatic; $R^2$ is chosen in the group consisting of: a $C_1$-$C_5$ aliphatic and an oxygen atom bound with a silicon atom of the base mesoporous silica; and $R^3$ is chosen in the group consisting of: a hydroxyl, a $C_1$-$C_5$ aliphatic and an oxygen atom bound with a silicon atom of the base mesoporous silica (I).

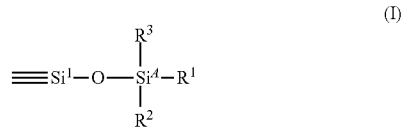

7 Claims, 2 Drawing Sheets

(51) Int. Cl.
| | |
|---|---|
| D21H 17/13 | (2006.01) |
| D21C 5/02 | (2006.01) |
| D21H 21/20 | (2006.01) |
| B01J 20/22 | (2006.01) |
| B01J 20/28 | (2006.01) |
| B01J 20/30 | (2006.01) |
| B01J 20/34 | (2006.01) |
| D21C 9/02 | (2006.01) |
| B32B 29/08 | (2006.01) |
| D21H 21/22 | (2006.01) |

(52) U.S. Cl.
CPC ... *B01J 20/28016* (2013.01); *B01J 20/28083* (2013.01); *B01J 20/3085* (2013.01); *B01J 20/3425* (2013.01); *B01J 20/3483* (2013.01); *B32B 29/08* (2013.01); *D21C 5/02* (2013.01); *D21C 9/02* (2013.01); *D21C 9/086* (2013.01); *D21H 17/13* (2013.01); *D21H 21/20* (2013.01); *D21H 21/22* (2013.01); *D21H 27/10* (2013.01); *B32B 2250/26* (2013.01); *B32B 2307/50* (2013.01); *B32B 2439/70* (2013.01)

(56) References Cited

OTHER PUBLICATIONS

Smook, Handbook for Pulp and Paper Technologists, 1992, Angus Wilde Publications, 2nd edition, chapters 13 and 16 (Year: 1992).*
International Search Report and Written Opinion for PCT Patent Application No. PCT/IB2017/054214 dated Nov. 14, 2017. 13 Pages.
Database WPI, Week 201646, Thomson Scientific, London, GB; AN 2016-29829S.

* cited by examiner

USE OF MESOPOROUS SILICA

The present application is filed pursuant to 35 U.S.C. 371 as a U.S. National Phase application of International Application No. PCT/IB2017/054214, which was filed on Jul. 12, 2017, and claims priority to Italian Application No. 102016000072535, which was filed on Jul. 12, 2016. The entire texts of the aforementioned applications are incorporated by reference in their entirety.

TECHNICAL FIELD

The present invention relates to a use of organofunctionalized silica and to a method for the production of a paper material (in particular, for food contact).

BACKGROUND OF THE INVENTION

Paper, both virgin and recycled, can contain high levels (up to thousands of mg/kg or ppm) of mineral oils (MOHs— Mineral Oil Hydrocarbons, containing a toxic saturated fraction—MOSH—and a carcinogenic aromatic fraction—MOAH, [JECFA, 59th report of the joint FAO/WHO expert committee on food additives (2002), WHO/TRS n. 913]) deriving from the printing process to which the paper material is subjected. Substances that interfere with the endocrine system, such as phthalates, are also often found in paper following their presence in glues and in the materials used to wrap the paper. Mineral oils are the solvent of pigments used in offset printing processes. When paper/paperboard, obtained both from virgin cellulose and from recycled paper, are used for foods (e.g. eggs, tea, pasta, frozen foods, breakfast cereals, pizzas etc.), the volatile fraction (which contains up to 25 carbon atoms of MOSH and MOAH) of the aforesaid mineral oils migrates to the food (Lorenzini et al. 2010; Saturated and aromatic mineral oil hydrocarbons from paperboard food packaging: Estimation of long-term migration from contents in the paperboard and data on boxes from the market; Food Additives and Contaminants—Part A Chemistry, Analysis, Control, Exposure and Risk Assessment; 27:1765-1774).

Food contamination from mineral oils coming from paper is today overcome by most food producers and distributors (e.g. Barilla and Coop) by switching to virgin paper for their food packagings, as existing technologies (recycled paper protected by a barrier) do not allow optimal workability of the paperboard in the cutting and packaging step and do not ensure satisfactory protection of foods from the contamination of mineral oils coming from paper and/or cardboard (Lommatzsch al., 2016. Functional barriers or adsorbent to reduce the migration of mineral oil hydrocarbons from recycled cardboard into dry food. Eur. Food Res Technol. DOI 10.1007/s00217-016-26726).

On the contrary, the addition of activated charcoal to the paper allows good protection of the foods but gives the paper material produced and recycled with it a dark color, that can find a use in the production of corrugated cardboard (tertiary packaging not in contact with food—Lommatzsch al., 2016. Functional barriers or adsorbent to reduce the migration of mineral oil hydrocarbons from recycled cardboard into dry food. Eur. Food Res Technol. DOI 10.1007/s00217-016-26726), but is not always desirable in paper and cardboard for food contact.

Currently available technology does not allow the safe use of recycled paper for food contact. This situation is in clear contrast with the current needs to reduce waste materials to a minimum.

The object of the present invention is to provide a use of organofunctionalized silica and a method for the production of paper, which makes it possible to overcome, at least partially, the drawbacks of the prior art and are, at the same time, easy and inexpensive to produce.

SUMMARY

According to the present invention, there is provided a use of organofunctionalized silica as described in the independent claim below and, preferably, in any one of the claims directly or indirectly dependent on the independent claim.

Unless explicitly specified to the contrary, the following terms have the meaning indicated below.

In the present text "aliphatic" means a non-aromatic and non-substituted hydrocarbon (unless the contrary is specified), saturated or unsaturated, linear, branched and/or cyclic. Non-limiting examples of aliphatic groups are: t-butyl, ethenyl, 1- or 2-propenyl, cyclohexyl.

In the present text, $C_x$-$C_y$ refers to a group that is meant as having from x to y carbon atoms.

In the present text "alkyl" means a saturated aliphatic (i.e., an aliphatic group without double or triple carbon-carbon bonds). Non-limiting examples of alkyls are: methyl, n-propyl, t-butyl, cyclohexyl.

BRIEF DESCRIPTION OF THE FIGURES

The invention is described below with reference to the accompanying figures, which illustrate some non-limiting embodiments thereof, wherein.

DETAILED DESCRIPTION

Figure 1:
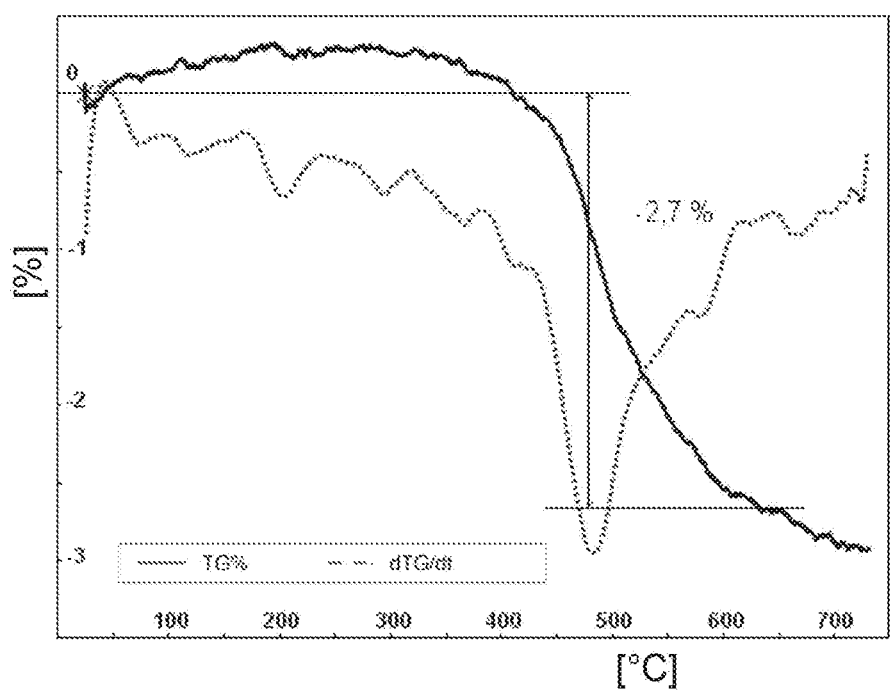
FIG. 1 is a thermogram and the derivative of the thermogram of MCM-41-Si(CH$_3$)$_3$ (weight loss—%—on the ordinate; temperature—° C.—on the abscissa)

In accordance with a first aspect of the present invention, a use of organofunctionalized mesoporous silica for the production of a paper material is provided (in particular, light colored) (such as paper and/or cardboard). In other words, a method is provided for the production of a paper material that provides for the use of organofunctionalized mesoporous silica.

Advantageously but not necessarily, the use provides for the production of paper material starting from previously used paper material, more precisely soiled paper and/or cardboard and/or similar (with ink from offset printing). In other words, in particular the use of the organofunctionalized mesoporous silica for the production of a recycled paper material is proposed (such as paper and/or cardboard) (in particular, light colored; more in particular, white).

The organofunctionalized mesoporous silica comprises a base mesoporous silica having, on its surface, groups having the following general formula (I):

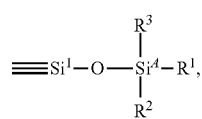

(I)

wherein $Si^1$ is a silicon atom of the base mesoporous silica; $R^1$ is a $C_1$-$C_5$ aliphatic; $R^2$ is chosen in the group consisting of: a $C_1$-$C_5$ aliphatic and an oxygen atom bound with a silicon atom of the base mesoporous silica; $R^3$ is chosen in the group consisting of: a hydroxyl, a $C_1$-$C_5$ aliphatic and an oxygen atom bound with a silicon atom of the base mesoporous silica.

The use of the organofunctionalized mesoporous silica has surprisingly enabled a noteworthy reduction in MOHs migration from the paper obtained to the outside environment. This is particularly useful when said paper is used in contact with food. Therefore, the use in accordance with the present invention is advantageously (but not exclusively) applied in the production of paper material (light colored, in particular white) for food use.

In this regard, it is important to note that surprisingly the organofunctionalized mesoporous silica exhibited a particularly high affinity for MOHs, which are stably adsorbed by the silica.

In this context, it has also been experimentally observed that the problem of retention in the paper of MOHs and their subsequent release in contact with foods is particularly felt in cardboards and paperboards which contain (to improve the mechanical properties of the material) a certain amount of mineral filler (usually, kaolin and/or calcium carbonate). Therefore, the use in accordance with the present invention has proved particularly useful in the re-use of paper material (for example cardboard and/or card) containing mineral filler.

According to the definitions established by IUPAC, mesoporous material is meant as a material with pore diameter greater than 2 nm and less than 50 nm (Rouquerol, J.; Avnir, D.; Fairbridge, C. W.; Everett, D. H.; Haynes, J. M.; Pernicone, N.; Ramsay, J. D. F.; Sing, K. S. W.; Unger, K. K. (1994). "Recommendations for the characterization of porous solids (Technical Report)". To measure porosity (more precisely, pore diameter) reference can be made to the description provided in Pure and Applied Chemistry 66 (8)) according to the BJH and NLDFT methods as reported in: S. Lowell, J. E. Shields, M. A. Thomas and M. Thommes in: Characterisation of porous solids and powders: Surface area, pore size and density. 2004 Kluwer Academic Publisher ISBN 1-4020-2302-2.

In particular, organofunctionalized mesoporous silica has a pore diameter from 1 nm to 20 nm (more precisely, from 2 nm to 16 nm). In some cases, organofunctionalized mesoporous silica has an surface area of at least 600 $m^2$ $g^{-1}$ (in particular, of at least 650 $m^2$ $g^{-1}$); more precisely, organofunctionalized mesoporous silica has a surface area of up to 1200 $m^2$ $g^{-1}$ (in particular, up to 1100 $m^2$ $g^{-1}$) in particular measured according to the BET method as indicated in S. Lowell, J. E. Shields, M. A. Thomas and M. Thommes in: Characterisation of porous solids and powders: Surface area, pore size and density. 2004 Kluwer Academic Publisher ISBN 1-4020-2302-2.

Advantageously but not necessarily, the base mesoporous silica is chosen in the group consisting of: MCM-41 (see, for example, "Synthesis of highly ordered MCM-41 silica with spherical particles", Arnošt Zukala, Matthias Thommesb, Jiři Čejkaa, Microporous and Mesoporous Materials, Volume 104, Issues 1-3, 23 Aug. 2007, Pages 52-58, doi: 10.1016/j.micromeso.2007.01.004), SBA-15 (and a combination thereof) (see, for example, Katiyar, Amit; Yadav, Santosh; G, Panagiotis; Neville, Smirniotis; Pinto, G (2006). "Synthesis of ordered large pore SBA-15 spherical particles for adsorption of biomolecules". Journal of Chromatography 1122 (1-2): 13-20. doi:10.1016/j.chroma.2006.04.055. PMID 16716334; "Synthesis and characterization of ordered mesoporous silica (SBA-15 and SBA-16) for adsorption of biomolecules", Sandra Maria Lopes dos Santos, Karina Alexandre Barros Nogueira, Marlon de Souza Gama, Jeann Diniz Ferreira Lima, Ivanildo José da Silva Jùnior, Diana Cristina Silva de Azeved; Microporous and Mesoporous Materials, Volume 180, 1 Nov. 2013, Pages 284-292, doi:10.1016/j.micromeso.2013.06.043.

In particular, the base mesoporous silica comprises (is) MCM-41.

According to some non-limiting embodiments, when $R^2$ and $R^3$ are aliphatics (in particular, alkyls), $R^1$, $R^2$ and $R^3$ are $C_1$-$C_3$. Alternatively or additionally, $R^2$ and $R^3$ are oxygen atoms each bound with a respective silicon atom of the base mesoporous silica.

In some cases $R^1$ is (an alkyl) $C_3$-$C_5$.

In some cases, $R^1$ is an alkyl; $R^2$ and $R^3$ are chosen, each independently of one another, in the group consisting of: an alkyl and an oxygen atom bound with a silicon atom of the base mesoporous silica. In particular, $R^1$, $R^2$ and $R^3$ are, each independently of one another, an aliphatic (more in particular, an alkyl).

Advantageously but not necessarily, $R^1$, $R^2$ and $R^3$ are, each independently of one another, a $C_1$-$C_5$ aliphatic (in particular, an alkyl). In particular, $R^1$, $R^2$ and $R^3$ are, each independently of one another, a $C_1$-$C_3$. In some specific cases, $R^1$, $R^2$ and $R^3$ each are a methyl.

According to some specific embodiments, the base mesoporous silica has, on its surface, groups having a formula chosen in the group consisting of:

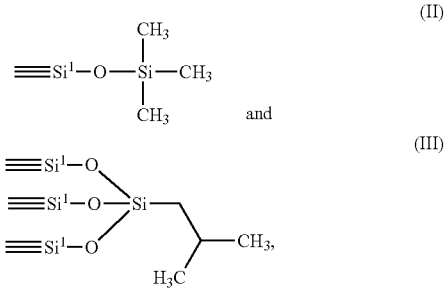

wherein each $Si^1$ is a respective silicon atom of the base mesoporous silica.

More in particular, the base mesoporous silica has on its surface groups having the formula (II).

In particular, the use comprises a mixing step, during which the organofunctionalized mesoporous silica and the paper pulp are mixed so as to obtain a work mixture.

According to some non-limiting embodiments, the paper pulp is obtained by means of a slushing step, during which paper (in particular, ground) is slushed with water so as to obtain the paper pulp.

In some cases, the use also comprises a cutting step, during which paper (in particular soiled; more in particular, with ink) is ground so as to obtain ground paper.

Advantageously but not necessarily, the use also comprises a washing step (which is at least partially subsequent to the mixing step and), during which the work mixture is caused to come into contact with water so as to obtain a washed pulp. In particular, during the washing step the water is made to flow through the work mixture. More precisely, during the washing step, a flow of water is caused to flow through the work mixture and a filter, which retains (at least partially) the work mixture (preventing the water from entraining the work mixture).

In particular, the use comprises a forming step, during which the washed pulp is used for the production of products made of paper material. More precisely, the paper material is (sheets) of paper or of cardboard.

In some cases, the use comprises a recovery step, during which at least part of the organofunctionalized mesoporous silica is separated from the paper pulp after the mixing step and before the forming step.

Advantageously but not necessarily, during the mixing step, particles (pellets and/or monoliths) having sizes (diameters) greater than 1 mm (in particular, greater than 5 mm) are caused to come into contact with cellulose pulp; these particles (the pellets and/or the monoliths) comprise (in particular consist of) the organofunctionalized mesoporous silica.

According to some non-limiting embodiments, the particles have sizes of less than 2 cm.

Particle (including pellets and/or monoliths) size means the size (diameter) of the particles themselves, which is obtained by means of subsequent sievings using sieves with decreasing hole sizes. The diameter of the holes of the first sieve that do not allow the particles to pass through indicates the size (or diameter) of the particles.

In some cases, during the mixing step, the pellets are caused to come into contact with cellulose pulp.

The pellets can be produced according to different known techniques, among which we mention those described in Topka et al. 2011 (Preparation of Al-SBA-15 pellets with low amount of additives: Effect of binder content on texture and mechanical properties. Application to Friedel-Crafts alkylation. Chem Eng J 168: 433-440), Han et al. 2014 (Synthesis and characterization of high-surface-area millimeter-sized silica beads with hierarchical multi-modal pore structure by the addition of agar. Mat. Charact. 9: 31-39), Sharma et al. 2012 (Amine modified and pelletized mesoporous materials: Synthesis, textural-mechanical characterization and application in adsorptive separation of carbon dioxide. Powder Technology 219: 86-98) and Lind et al. 2003 (Spherical silica agglomerates possessing hierarchical porosity prepared by spray drying of MCM-41 and MCM-48 nanospheres. Microp. and Mesop. Mat. 66: 219-227) with a limited loss of specific surface area (up to a minimum of 5%).

In some cases, during the mixing step, monoliths are caused to come into contact with cellulose pulp. According to various embodiments, the monoliths can have different shapes (for example, they can be cylindrical).

The monoliths can be produced using different known techniques among which we cite those described in Liang et al. 2002 (Use of gel-casting to prepare HPLC monolithic silica columns with uniform mesopores and tunable macrochannels. CHEM. COMMUN. 2680-2681) with micro and mesopores of a size adjustable according to needs.

The organofunctionalized pellets and monoliths can be easily recovered from the pulp, making it possible to obtain a pulp with a reduce MOHs content. In this way, it is possible to further improve the safety of the paper material obtained, further reducing the amount of MOHs that can subsequently migrate from the paper material to the foods.

Advantageously but not necessarily, the use comprises a regeneration step, which is subsequent to the recovery step and during which (at least part of the) the MOHs and/or MOSH are removed from the mesoporous silica (more precisely, from the pellets or monoliths) that has been separated from the paper pulp (paper and/or washed). In particular, during the regeneration step, the organofunctionalized mesoporous silica is heated (the pellets or the monoliths are heated) to a temperature up to 400° C. (more in particular, up to 300° C.) Advantageously, during the regeneration step, the organofunctionalized mesoporous silica is heated (the pellets are heated) to a temperature of at least 150° C. (more in particular, at least 200° C.)

It should be noted that the recovery step can also be carried out at pressures of less than 1 atm. In these cases, the organofunctionalized mesoporous silica is heated to a temperature below those indicated above.

In this way, the organofunctionalized mesoporous silica can (the pellets or monoliths) be used can be used) again for further mixing steps and therefore to reduce the MOHs content in further pulps.

In some cases (therefore), the use comprises at least a further mixing step (defined in the same way as the mixing step described above), which is subsequent to the recovery step (and to the regeneration step) and during which at least part of the organofunctionalized mesoporous silica (obtained following the recovery and regeneration steps) and of the further paper pulp are mixed so as to obtain a further work mixture.

Advantageously but not necessarily, the use also comprises a further washing step (defined in the same way as the washing step described above) of the further work mixture so as to obtain a further washed pulp; and a further forming step (defined in the same way as the forming step described above), during which the further washed pulp is used.

In some cases, other further steps of recovery, regeneration, mixing, washing, forming etc. are provided.

Figure 3:
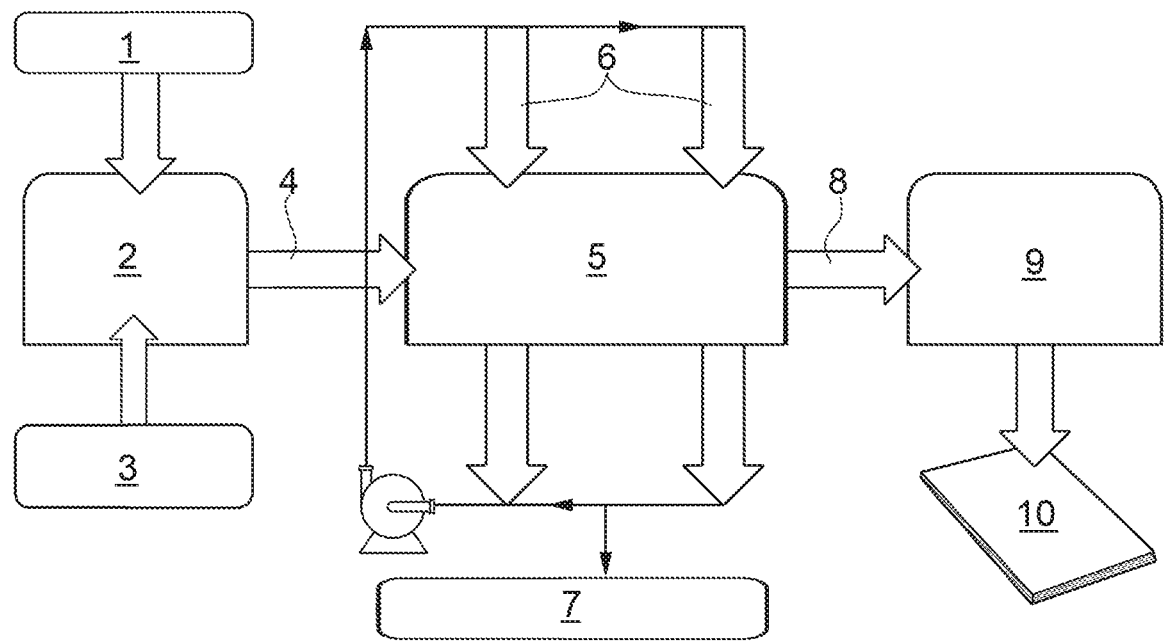
FIG. 3 is a diagram of a method in accordance with the present invention.

FIG. 3 schematically illustrates a specific and non-limiting example of embodiment of the use described, wherein the reference numeral 1 indicates the feed of ground paper to a unit 2 for the production of pulp (pulper); the reference numeral 3 indicates the feed of organofunctionalized mesoporous silica to the unit 2. In the unit 2 the slushing and mixing steps take place. The work mixture thus obtained 4 is taken to a washing device 5, in which the washing step is carried out using mains water 6 and which comprises a filter.

The pellets or monoliths are positioned in the pulper 2 at the end of the paper pulping process or, if provided, in the washing device 5. The washed pulp 8 coming from the device 5 is used in a forming device 9 to obtain a sheet of paper 10.

Unless explicitly indicated to the contrary, the content of the references (articles, books, patent applications, etc.) cited in this text is herein referred to in full. In particular, the references mentioned are herein incorporated by reference.

Further characteristics of the present invention will be apparent from the following description of purely illustrative and non-limiting examples.

Example 1

This example illustrates the procedure used for the production of some starting materials.

Mineral oil: a standard blend Paraset 32H (Petrochem Carless, Leatherhead—UK) was chosen for its composition (respectively 87.5 and 12.5% weight/weight of aliphatic and aromatic hydrocarbons).

Synthesis of SBA-15-Si(CH$_3$)$_3$ and MCM-41-Si(CH$_3$)$_3$: the materials were synthesized adapting the procedure described by Batonneau-Gener et al 2010 (Tailoring the Hydrophobic Character of Mesoporous Silica by Silylation for VOC Removal. Separation Science and Technology. 2010/03/22; 45:768-775). Briefly, the procedure below was followed for the surface organofunctionalization of MCM-41 and SBA-15: 2 g of each solid were placed in a three-necked flask and heated to 200° C. for 2 hours. After the heat treatment, the material was cooled to room temperature under nitrogen flow and 40 ml of anhydrous toluene (Carlo Erba, analytic level) was then added. Finally, $2\times10^{-3}$ moles of hexamethyldisilazane, corresponding to around 420 µl (99.9%, Sigma-Aldrich) was added dropwise and the reaction mixture was maintained at 110° C. for 3 hours. Subsequently, the organofunctionalized material was recovered and dried in the oven at 40° C. for 24 hours. Organofunctionalized SBA-15 and MCM-41 were called respectively SBA-15-Si(CH$_3$)$_3$ and MCM-41-Si(CH$_3$)$_3$ and the percentage of organic molecules grafted onto the silicas determined by thermogravimetric analysis TGA was respectively 4.1 and 2.7% of the weight of the organofunctionalized material.

The materials obtained had the characteristics indicated in Table 1.

TABLE 1

| Adsorbent material | Particle size (µm) | Pore size (nm) | Specific Surface area (m$^2$ g$^{-1}$) | MOHs adsorption (% dry weight) |
|---|---|---|---|---|
| SBA-15-Si (CH$_3$)$_3$ | <1 | 6.5-15 | 690-1040 | 318 |
| MCM-41-Si (CH$_3$)$_3$ | <1 | 2.5 | 729 | 184 |

Paper recovered: to produce highly contaminated recycled paper, five fresh copies of an Italian newspaper were used ("Il Giornale" printed on 22 Oct. 2014), containing a considerable amount of MOH (>3000 mg kg$^{-1}$ dry weight, see Table 4). In order to maximize the MOHs level present in the pulp and sheet of paper produced, the pages with the greatest extension of colored parts were chosen and the material selected was processed immediately so as to reduce MOHs loss through evaporation. The recycled paper produced with and without the additive MCM-41-Si(CH$_3$)$_3$ was obtained from the same selection of pages. The pages were cut into pieces measuring 2 cm×2 cm using an office paper shredder (GBC, USA) before handling the pulp and producing the paper.

Example 2

This example describes the adsorption tests conducted on various types of organofunctionalized silica.

The materials indicated in Table 1 were evaluated for their capacity of adsorbing MOHs from water.

Around 50 mg of each adsorbent material was inserted in 2 mL microcentrifuge tubes (Eppendorf® Safe-Lock). 2 mL of water MilliQ® and 350 µl of mineral oil (d 0.836 g/ml at 15° C.) were added to each tube. The suspension obtained appeared separated into three phases as follows: the adsorbent as solid phase; the aqueous solution containing the soluble portion of MOHs and the mineral oil as distinct liquid phases. The suspensions were kept under magnetic stirring at room temperature for one night. After stirring stopped, the residual supernatant mineral oil was removed with a cotton bud and the remaining suspension was centrifuged at 15000 rpm for 15 minutes. The aqueous solution was then removed from each tube using a Pasteur pipette, while the adsorbent remaining inside the tube was dried in the oven at 40° C. for 24 hours. The same tests were conducted on the SBA-15-Si(CH$_3$)$_3$ and MCM-41-Si(CH$_3$)$_3$ organofunctionalized control materials (i.e. without mineral oil) for comparison.

Figure 4:
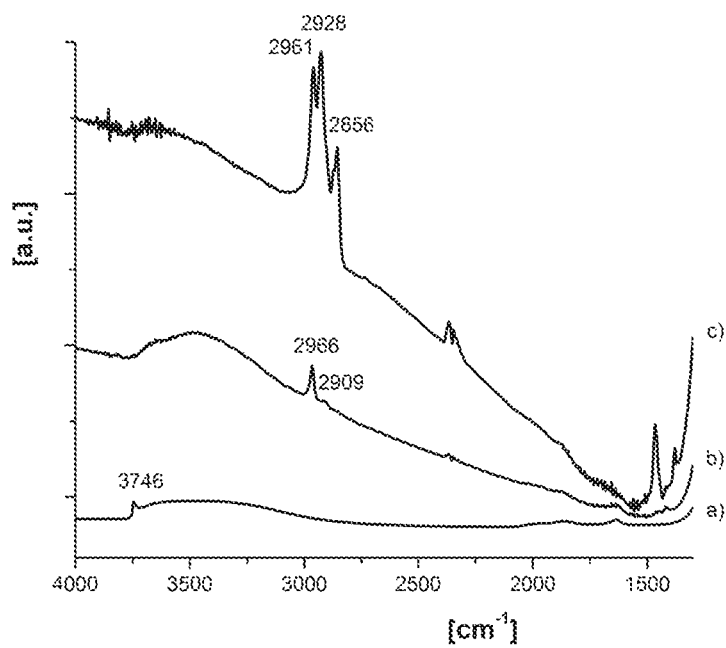
FIG. 4 is an FT-IR spectrum of a) MCM-41, b) MCM-41-Si(CH$_3$)$_3$, c) MCM-41-Si(CH$_3$)$_3$ after the MOHs adsorption (absorbance—arbitrary units—on the ordinate; wave number—cm$^{-1}$—on the abscissa).

The amount of MOHs adsorbed by each adsorbent was determined by means of thermogravimetric analysis (TGA-DTG) and compared with the analysis conducted on the control material. In addition, the nature of the MOH species adsorbed on the MCM-41-Si(CH$_3$)$_3$ was studied by means of infrared spectroscopy (FT-IR; see FIG. 4, in which a) is the spectrum of MCM-41; b) is the spectrum of MCM-41-Si (CH$_3$)$_3$; c) is the spectrum of MCM-41-Si(CH$_3$)$_3$ after MOHs adsorption). The IR spectra were recorded by means of a Tensor27 spectrometer (Bruker, USA) provided with an IR cell with KBr windows permanently connected to a vacuum line (residual pressure ≤1×10$^{-4}$ mbar).

Before IR analysis, 5 mg of adsorbent was mixed with 20 mg of KBr (Sigma-Aldrich) and rapidly made into pellets with a SPECAC (UK) mechanical press at a pressure of 5 tons cm$^{-2}$. The pellets were then positioned in the IR cell and subjected to a pressure of around 2×10$^{-2}$ mbar for 10 seconds to obtain further dehydration. Samples of control adsorbents (i.e. materials that were not in contact with MOHs) were analyzed for comparison.

Figure 2:
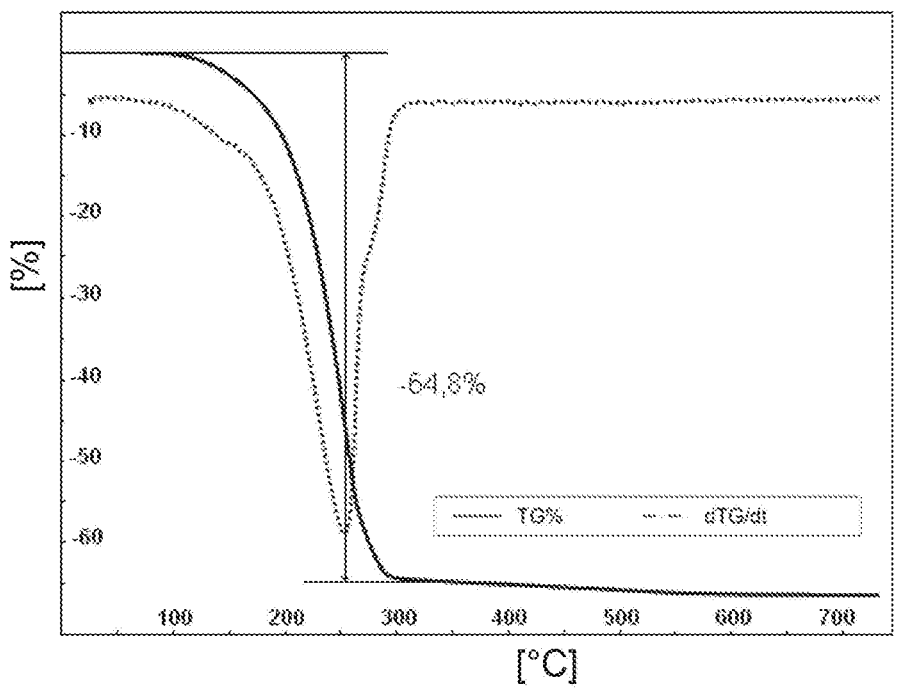
FIG. 2 is a thermogram and the derivative of the thermogram of MCM-41-Si(CH$_3$)$_3$ after it has been kept in contact with MOHs (weight loss—%—on the ordinate; temperature—° C.—on the abscissa)

The amount of mineral oil (MOHs) adsorbed by each adsorbent was measured comparing the TGA of each adsorbent before and after adsorption of the mineral oil. According to the data collected, the two adsorbents with the highest MOHs adsorption capacity were SBA-15-Si(CH$_3$)$_3$ and MCM-41-Si(CH$_3$)$_3$ (respectively 318% and 184% of the mass of the adsorbent). FIGS. 1 and 2 show the thermogram (TGA) and the derivative of the thermogram (DTG) of MCM-41-Si(CH$_3$)$_3$ before and after adsorption of mineral oil. With regard to the control material (i.e., the MCM-41-Si(CH$_3$)$_3$ that was not caused to come into contact with MOHs; FIG. 1), the most consistent weight loss (around 2.7%) at a temperature greater than 400° C. (negative peak centered around 500° C. in the DTG curve) is due to the release of species deriving from the elimination of methyl groups bonded to the silica (elimination of organofunctionalization). Considering the high temperature at which the organic functionalities are released, the organofunctionalized material can be considered highly stable (i.e. it does not lose organic functionalization) at temperatures below 400° C.

The TG/DTG analysis of MCM-41-Si(CH$_3$)$_3$ caused to come into contact with MOHs (FIG. 2) exhibited a consistent weight loss of around 65% of weight due to the release of MOHs within 300° C. The adsorbent was therefore able to adsorb MOHs to 318% of its weight. In the thermogram, the loss of methyl groups that occurs at a temperature of over 400° C. is not appreciable due to their low percentage with respect to the weight loss due to the MOHs. The loss of MOHs at a temperature below 300° C. is a sign of good thermal regenerability of the organofunctionalized material (organic functionalization is lost at temperatures exceeding 400° C.)

Example 3

This example describes the production of recycled paper. The process is schematically illustrated in FIG. 3.

The recovered paper (obtained as described in example 1) was inserted in a unit 2 for the production of pulp, slushed and homogenized with water and the adsorbent. The suspension thus obtained was subsequently washed in the washing unit 5. The washed pulp was collected and the sheets were prepared in a typical device 9 for this purpose.

Pulp production step: 50 g (dry weight) of recovered paper and 0.5 g of adsorbent phase MCM-41-Si(CH$_3$)$_3$ were mixed with 1200 mL of mains water (pH 7.2) at 40° C. for 10 minutes in a standard laboratory disruptor (Enrico Toniolo, Italy) (corresponding to the unit 2 of FIG. 3) according to the requirements of ISO 5263 until the paper was slushed. The process was repeated twice in order to obtain, in total, 100 g of recycled pulp with the addition of the adsorbent. A similar amount of pulp was produced without adsorbent as reference sample. The MOHs content was determined in both the pulps.

Washing step: the paper pulp (100 g) was dispersed in around 2.4 L of mains water and arranged in a Somerville fractionator (Lorentzen & Wettre, Sweden) (corresponding to the unit 5 of FIG. 3). The washing unit was equipped with a net with a mesh size of 150 (hole diameter 105 μm) positioned on the bottom and was operated as a washing machine capable of retaining the cellulose fibers. The unit was supplied with mains water with a flow of 4.7 l min$^{-1}$ for 15 minutes. The control pulp (without adsorbent) was washed according to the same conditions.

Production of sheets of recycled paper: around 50 g of washed pulp (both with and without MCM-41-Si(CH$_3$)$_3$) was diluted in around 5 L of mains water, homogenized and used for the production of sheets of recycled paper using standard Rapid-Kothen equipment (Estanit GmbH, Germany—sheet former) (corresponding to the device 9 of FIG. 3) according to ISO 5269-2. The sheets of recycled paper with grammage 140 g m$^{-2}$ were then vacuum dried at 93° C. and at −950 mbar for 10 min.

Example 4

This example describes the MOH analysis in the cellulose material.

The content of MOH of the cellulose with different degree of humidity (newspaper, pulp, washed pulp) was determined as described by Lorenzini et al. 2010 (Migration kinetics of mineral oil hydrocarbons from recycled paperboard to dry food: Monitoring of two real cases. Food Additives and Contaminants—Part A Chemistry, Analysis, Control, Exposure and Risk Assessment. 30:760-770). Briefly, wet samples (specifically, pulp and washed pulp) corresponding to around 1 g of dry weight were arranged in 100 mL flasks with ground glass caps and 25 mL of ethanol was added (level 95% HPLC, J. T. Baker). The flasks were then arranged on an Intercontinental Suprema horizontal agitator. After 1 hour of stirring, 20 mL of n-hexane (analytic level, Carlo Erba SPA) was added to each flask and the suspension was left under stirring for one night. The samples were left to settle for one hour and subsequently around 10 ml of water MilliQ® was added to allow better separation of the ethanol and n-hexane phases. Dry samples (specifically, the recovered paper) were subjected to the same procedure described above for the wet samples, with the exception of the use of 5 mL (instead of 25 mL) of ethanol and 5 mL (instead of 20 mL) of n-hexane.

Finally, 5 mL of n-hexane was collected and analyzed with regard to MOHs content (expressed as fraction of hydrocarbons with a number of carbons greater than 12—without differentiating between the aliphatic and aromatic components) by means of GC-FID analysis according to the method EPA 8015D 2003.

Table 3 shows the results obtained (analytical error<1%).

TABLE 3

|  | Il | Pulp | | Washed pulp | | Sheets of paper | |
|---|---|---|---|---|---|---|---|
|  |  | With additive | Control | With additive | Control | With additive | Control |
| MOHs (mg kg$^{-1}$ dry weight) | 3125 | 961.5 | 638.5 | 615.8 | 502.7 | 286.0 | 236.1 |

According to the data obtained, the freshly printed newspaper contained over 3000 mg MOHs kg$^{-1}$ of dry mass.

The MOH content of the control pulp (638.5 mg kg$^{-1}$) was 20% of the content determined in the newspaper (3125 mg kg$^{-1}$), indicating that the mechanical disintegration action is responsible for the release of adsorbed hydrocarbons to the cellulose fibers. It is interesting to note that the pulp produced in the presence of additive (adsorbent) exhibited a MOH content (961.5 mg kg$^{-1}$) higher by a third with respect to the control. The higher MOHs content is proof of the high affinity of the adsorbent for hydrocarbons. After washing, the MOHs content decreased further to 16% and 20% of the amount contained initially in the recovered paper (newspaper Il Giornale) respectively for the control and for the sample with adsorbent added.

Subsequently, during formation of the sheets, the amount of MOH decreased proportionally to the content in the pulp following the formation conditions (93° C. and −950 mbar for 10 minutes).

The MOHs content in the paper with additive and the control was respectively 286 and 236 mk kg$^{-1}$.

Example 5

This example describes an analysis of the optical properties of the pulps.

The optical properties (ISO brightness and ink elimination—IE700) were measured on pulp discs weighing 225 g m$^{-2}$ obtained by filtering a correct amount of pulp on a Buchner funnel.

The ISO brightness was measured according to ISO 2470-1:2009 (CIE Illuminant C). The results obtained are indicated in Table 4 below.

TABLE 4

|  | Pulp | | Washed pulp | |
|---|---|---|---|---|
|  | With additive | Control | With additive | Control |
| ISO brightness (%) | 46.8 | 46.6 | 56.8 | 56.8 |

Elimination of ink (IE 700) measured according to the method INGEDE 2:2014 was of 75.0% and of 74.3% respectively for the sample with additive and for the control.

In view of the fact that no difference in brightness was identified between the samples with additive and the control samples both during the pulp production and washing steps, it can be concluded that the presence of the additive does not alter the optical qualities of the material.

Example 6

This example describes an analysis of MOSH and MOAH migration from sheets of recycled paper to food (GC-FID method named Silliker 004 MPP FCM040 Rev 2 2012 conducted at the laboratories Chelab Silliker—Accredia lab n° 0144, Tuscany lab 016).

A durum wheat flour (semolina), with MOHs content below the quantification limit (LOQ=0.5 mg kg$^{-1}$), was used for these tests.

A sheet of recycled paper produced with the additive MCM-41-Si(CH$_3$)$_3$ was caused to come into contact with the durum wheat flour and an accelerated migration test was conducted at 40° C. for 15 days.

Table 5 shows the MOH level, and its saturated (MOSH) and aromatic (MOAH) components measured in samples of paper and food before and after the migration test. Table 5 indicates the hydrocarbon component with C≤24, as recent studies (Lorenzini et al. 2013; Migration kinetics of mineral oil hydrocarbons from recycled paperboard to dry food: Monitoring of two real cases. Food Additives and Contaminants—Part A Chemistry, Analysis, Control, Exposure and Risk Assessment. 30:760-770) showed that hydrocarbon migration C≥25 is negligible.

With regard to the starting materials (day 0 of the accelerated migration test), the MOHs content of the sheet with additive (272 mg kg$^{-1}$ dry mass) was 25% higher than that of the control (220 mg kg$^{-1}$ dry mass), hence in accordance with the analysis conducted with the EPA 8015D 2003 method (see table 4). As the Silliker 004 MPP FCM040 Rev 2 2012 and EPA 8015D 2003 methods considered different hydrocarbon fractions (the former the fraction with C≤24 and the latter the fraction with C>12), direct comparison between the results is not correct, even if they are numerically similar.

TABLE 5

| Samples | MOSH C ≤ 24 | MOAH C ≤ 24 | MOHs C ≤ 24 |
|---|---|---|---|
| Accelerated migration test on semolina (day 0) | | | |
| Paper with additive | 210.0 ± 37.0 | 62.0 ± 15.0 | 272.0 ± 52.0 |
| Control Paper | 168.0 ± 28.0 | 52.0 ± 10.0 | 220.0 ± 38.0 |
| Accelerated migration test on semolina (day 14) | | | |
| Paper with additive | 188.0 ± 33.0 | 51.0 ± 12.0 | 239.0 ± 45.0 |
| Control Paper | 70.0 ± 12.0 | 22.0 ± 5.0 | 92.0 ± 17.0 |
| Semolina on paper with additive | 3.1 ± 0.8 | 1.2 ± 0.3 | 4.3 ± 1.1 |
| Semolina on control paper | 15.9 ± 4.3 | 4.5 ± 1.2 | 20.4 ± 5.5 |

After the migration test was completed, the control paper had reduced its MOHs content (92 mg kg$^{-1}$ dry weight) to 40% of the initial amount and a consistent amount of MOHs had been transferred to the flour (20.4 mg kg$^{-1}$ dry weight).

When the migration test was conducted with a sheet with additive, the paper had a MOHs level of 88% of the initial quantity and the flour only 8%. This positive result is even more interesting if we consider that the initial MOHs content in the paper with additive was greater than the control (respectively 272.0 and 220.0 kg$^{-1}$ dry weight).

The invention claimed is:

1. A method of using a organofunctionalized mesoporous silica for the production of a paper material; the organofunctionalized mesoporous silica comprises a base mesoporous silica having, on its surface, groups having the following general formula (I):

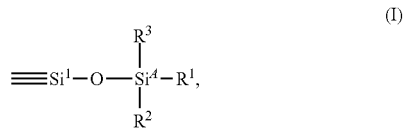

wherein Si$^1$ is a silicon atom of the base mesoporous silica;
R$^1$ is a C$_1$-C$_5$ aliphatic;
R$^2$ is chosen in the group consisting of a C$_1$-C$_5$ aliphatic and an oxygen atom bound with a silicon atom of the base mesoporous silica;
R$^3$ is chosen in the group consisting of a hydroxyl, a C$_1$-C$_5$ aliphatic and an oxygen atom bound with a silicon atom of the base mesoporous silica;
the method comprising a mixing step, during which the organofunctionalized mesoporous silica and paper pulp are mixed so as to obtain a work mixture;
a slushing step, during which paper containing MOHs (mineral oil hydrocarbons) is slushed with water so as to obtain the paper pulp;
a washing step, which is at least partially subsequent to the mixing step and during which the work mixture is caused to come into contact with water so as to obtain a washed pulp;
a forming step, during which the washed pulp is used for production of products made of paper material;
a recovery step, during which at least part of the organofunctionalized mesoporous silica is separated from the paper pulp or the washed pulp after the mixing step and prior to the forming step; and
a regeneration step, which is subsequent to the recovery step and during which at least part of the MOHs are removed from the organofunctionalized mesoporous silica that was previously separated from the paper pulp or the washed pulp.

2. The method according to claim 1, wherein the base mesoporous silica is chosen from the group consisting of: Mobil Composition of Matter No. 41 (MCM-41), Santa Barbara Amorphous-15 (SBA-15), and a combination thereof.

3. The method according to claim 1, wherein R$^1$ is an alkyl; R$^2$ and R$^3$ are chosen, each independently of one another, from the group consisting of an alkyl and an oxygen atom bound with a silicon atom of the base mesoporous silica.

4. The method according to claim 1, wherein R$^1$, R$^2$ and R$^3$ are, each independently of one another, a C$_1$-C$_5$ aliphatic.

5. The method according to claim 1, wherein R$^1$, R$^2$ and R$^3$ are C$_1$-C$_3$ alkyls.

6. The method according to claim 1, wherein during the mixing step, particles having diameters greater than 1 mm are caused to come into contact with the paper pulp, said particles comprising the organofunctionalized mesoporous silica.

7. The method according to claim 6, wherein said particles are pellets and/or monoliths.

* * * * *